July 28, 1936.  A. PASCHEKA  2,048,945

MOVABLE AUTOMOBILE FRONT BUMPER

Filed April 27, 1932

INVENTOR,
ALFRED PASCHEKA,
BY Fetherstonhaugh & Tansley
ATTORNEY

Patented July 28, 1936

2,048,945

UNITED STATES PATENT OFFICE 2,048,945

MOVABLE AUTOMOBILE FRONT BUMPER

Alfred Pascheka, Pegau, Germany

Application April 27, 1932, Serial No. 607,835

3 Claims. (Cl. 293—55)

My invention relates to improvements in movable automobile front bumpers, and the object of the invention is to devise a resiliently mounted bumper bar wherein means is provided for moving it into an operative position to absorb the impact with another vehicle or with any other stationary or movable obstacle. A further object is to devise manual means for moving the bumper bar into the operative position, and a still further object is to provide means for automatically moving the bumper bar into the operative position upon impact with an obstruction should the operator of the car fail to actuate the manual means.

Another object is to provide means for restoring the device to the inoperative position wherein it is reset for either automatic or manual operation, and yet another object is to devise additional means for normally retaining the bumper bar in the inoperative position.

With the above and other objects in view which will hereinafter appear as the specification proceeds, my invention consists of the construction all as hereinafter described and illustrated in the accompanying drawing in which:—

Like characters of reference indicate corresponding parts in the different views.

Figure 1:
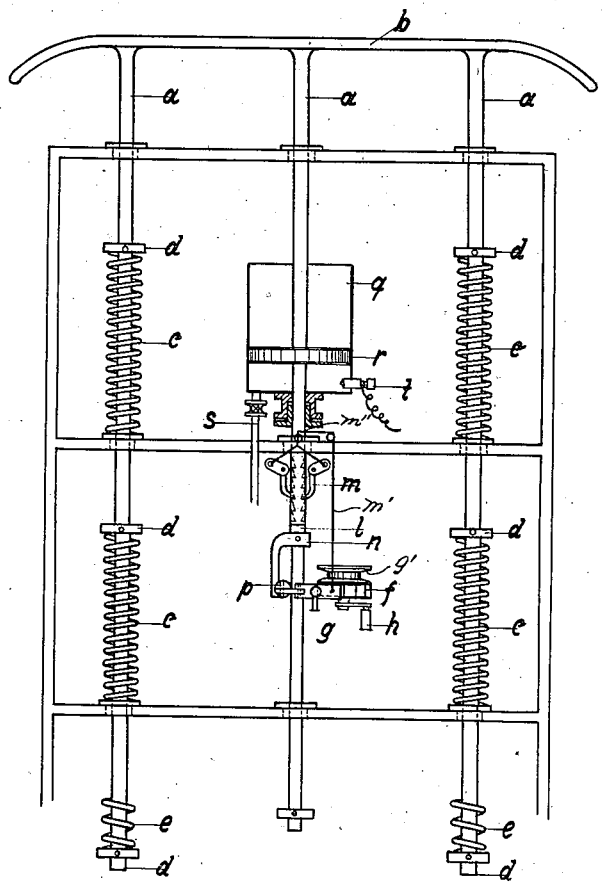
Fig. 1 represents a plan view of the forward part of a car chassis frame showing my device applied thereto.
Figure 2:
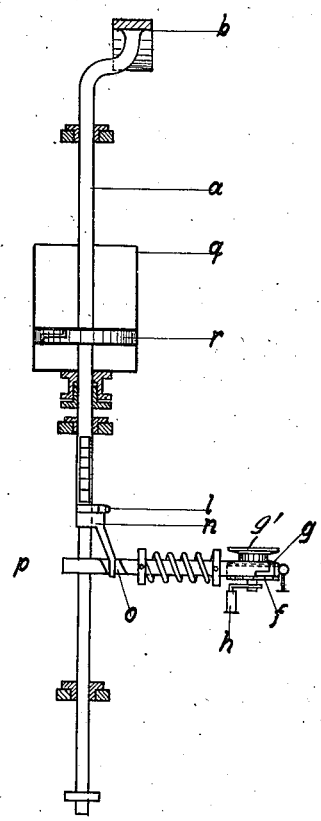
Fig. 2 is a longitudinal vertical section.
Figure 3:
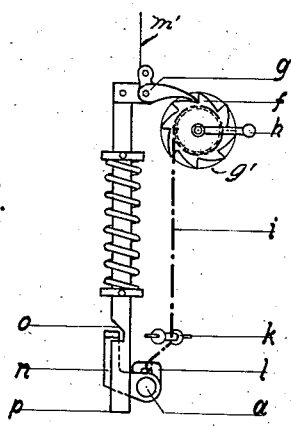
Fig. 3 is an enlarged elevational detail showing the means for restoring the bumper bar to its inoperative position.

The bumper bar $b$ is provided with a plurality of spaced guide bars $a$ extending rearwardly and freely through transverse members of the chassis frame. The outer bars $a$ are provided with collars $d$ and pressure springs $c$ are mounted on the bars between the collars $d$ and the transverse members of the chassis frame disposed rearwardly thereof. When the bumper is in the inoperative position as illustrated in Fig. 1, the springs $c$ are compressed and will propel the bumper bar forwardly into its operative position when the controling mechanism as hereinafter described is released. Additional collars $d$ are provided on the rear ends of the outer guide bars $a$ and buffer springs $c$ are mounted on the bars $a$ between these latter collars and the transverse member of the chassis frame located forwardly thereof to buffer the action of the device when the bumper bar is released into its operative position.

The mechanism for releasing the bumper bar so that it may move into its operative position under the influence of the springs $c$ and for resetting the device comprises a latch $n$ pivotally connected to the centre guide bar $a$ and adapted to engage an angularly disposed slot $o$ in the vicinity of one end of a slidable rod $p$. The other end of the rod $p$ is provided with a pivoted pawl $g$ adapted to be connected to an operating lever (not shown) within reach of the operator of the car, and this pawl $g$ engages the teeth of a ratchet $f$ connected to a cable drum $g'$, which latter is provided with a crank $h$. A cable $i$ extends from an ear $l$ on the centre guide bar $a$ over the roller $k$ and is connected to and adapted to be wound upon the drum $g'$.

To take the strain off the cable $i$ when the device is in the inoperative position, opposed spring held pawls $m$ engage a double rack formed on the central guide bar $a$ and to release such pawls when it is desired to actuate the device they are connected by a cable $m'$ over pulleys $m''$ with the pawl $g$.

As a supplemental means of actuating the bumper bar $b$ into its operative position, a cylinder $q$ may be provided around the central bar $a$ and its piston $r$ secured thereto. Explosive mixture may be inserted between the cylinder head and the piston $r$ through the inlet pipe $s$ to be fired by a spark plug $t$ which may have in its electrical connection to a source of current supply a switch (not shown) which is operated by the movement of the pawl $g$.

To actuate the bumper bar manually, the operator of the car merely releases the pawl $g$ through the medium of the operating lever (not shown) and the springs $c$ propel the bumper bar into the operative position, such springs taking the force of the impact when the bumper bar strikes an obstruction and absorbing the shock, it being understood that simultaneously with the release of the pawl $g$, the connected pawls $m$ are released thus enabling the bumper to move forward.

In the event of the car operator not manually operating the device, as soon as the bumper bar strikes an obstruction and is moved rearwardly thereby a small extent, the finger $n$ through the medium of the angular slot with which it engages forces the rod $p$ to the left releasing the pawl $g$ from the ratchet $f$ thus enabling the springs $c$ to force the bumper bar into its operative position wherein they absorb the shock. In this case the release of the pawl $g$ also actuates the pawls $m$ into their disengaged position with the rack on the central bar $a$.

To reset the device it is only necessary to wind up the cable $i$ on the drum $g'$ by means of the crank $h$. As the cable $i$ is wound up it draws back the central bar $a$ to which it is connected until the bumper bar is in the inoperative position, the pawl $g$ engaging the ratchet $f$ during such rewinding.

I claim:

1. In a device of the character described, a frame, guide bars slidably mounted in said frame and projecting beyond the forward end of said frame, a buffer bar connected to said guide bars, spring members associated with said guide bars, means for retracting and normally retaining said guide bars against action by the springs, a cylinder arranged upon one of said guide bars, a piston slidably arranged therein, means for feeding a gas mixture into said cylinder, and means whereby the gas mixture may be fired to drive the piston forward and permit the release of the buffer bar from its retracted position to an extended position.

2. In a device of the class described, a movable bumper having a guide bar, a piston arranged upon said guide bar, said piston slidably mounted in a cylinder, means for feeding a gas mixture into said cylinder, and means for firing said mixture to permit the piston to move forwardly and cause the bumper to move outwardly to take up shock.

3. A rebuffing apparatus including a frame, guide bars slidably arranged in the frame and when actuated projecting beyond the forward part thereof, a bumper bar connected to the forward ends of the guide bars, spring members associated with the guide bars for forcing them and the connected bumper bar forwardly, cable means connected to a guide bar for retracting the guide bars and the connected bumper bar against the action of the springs, manually controlled releasable means associated with the cable means for normally holding the guide bars and the connected bumper bar in the retracted position and upon release permitting the guide bars and the connected bumper bar to be moved forwardly under the action of the springs whereby the latter take the shock upon the bumper bar striking an obstruction, additional releasable means coacting with a guide bar for normally holding the guide bars and the connected bumper bar in their retracted position, and means, interconnected with the releasable means associated with the cable means, for releasing the releasable means coacting with a guide bar simultaneously with the release of said releasable means associated with the cable means.

ALFRED PASCHEKA.